(12) United States Patent
Song et al.

(10) Patent No.: US 8,054,741 B2
(45) Date of Patent: Nov. 8, 2011

(54) METHOD AND APPARATUS FOR JOINT SCHEDULING TO INCREASE FREQUENCY EFFICIENCY AND FAIRNESS IN A DISTRIBUTED ANTENNA SYSTEM USING FREQUENCY REUSE AND COMMON POWER CONTROL

(75) Inventors: Ki-Uk Song, Suwon-si (KR); Seong-Taek Hwang, Pyeongtaek-si (KR); Won-Jin Sung, Seoul (KR); Jin-Woo Choe, Seoul (KR); Byoung-Seok Lee, Nonsan-si (KR); Byung-Wook Jun, Seoul (KR)

(73) Assignees: Samsung Electronics Co., Ltd., Maetan-Dong, Yeongtong-Gu, Suwon-Si, Gyeonggi-Do (KR); Industry-University Cooperation Foundation Sogang University, Sinsu-Dong, Mapo-Gu, Seoul (KR)

( * ) Notice: Subject to any disclaimer, the term of this patent is extended or adjusted under 35 U.S.C. 154(b) by 971 days.

(21) Appl. No.: 11/964,973

(22) Filed: Dec. 27, 2007

(65) Prior Publication Data
US 2008/0192702 A1 Aug. 14, 2008

(30) Foreign Application Priority Data
Feb. 9, 2007 (KR) .................. 10-2007-0013746

(51) Int. Cl.
*H04W 28/00* (2009.01)
*H04B 7/17* (2006.01)
*H04L 27/00* (2006.01)

(52) U.S. Cl. ......... 370/208; 370/210; 455/522; 375/260

(58) Field of Classification Search .................. 370/203, 370/208, 210; 375/260, 346; 455/522
See application file for complete search history.

(56) References Cited

U.S. PATENT DOCUMENTS
6,317,435 B1 11/2001 Tiedemann, Jr. et al. ...... 370/441
7,248,841 B2 * 7/2007 Agee et al. .................... 455/101
(Continued)

FOREIGN PATENT DOCUMENTS
KR 2002-064939 8/2002
KR 2005-23187 3/2005
KR 2005-114589 12/2005
(Continued)

OTHER PUBLICATIONS

Han, Zhu, et al.; "Joint Power Control and Blind Beamforming Over Wireless Networks: A Cross Layer Approach;" EURASIP Journal on Applied Signal Processing' 2004:5; pp. 751-761.

*Primary Examiner* — Chi Pham
*Assistant Examiner* — Ahmed Elallam
(74) *Attorney, Agent, or Firm* — Cha & Reiter, LLC

(57) ABSTRACT

A joint scheduling apparatus and method for increasing frequency efficiency and fairness in a distributed antenna system using frequency reuse and common control power. Packets are selected for transmission to be transmitted to MSs are selected, taking into account QoS in at least one of a BS and an RS and grouped into packet groups. The packets are selected from the packet groups, links corresponding to the packets are grouped into a link group, a joint power control is performed on the link group, link elimination and link addition are performed for the link group until optimal solutions are achieved for the links of the link group in the joint power control. Channels are allocated to the links when the optimal solutions are achieved for the links, and the status of a user queue of at least one of the BS and the RS is updated.

4 Claims, 4 Drawing Sheets

U.S. PATENT DOCUMENTS

| | | | | |
|---|---|---|---|---|
| 7,567,543 B2* | 7/2009 | Cao et al. | ...... | 370/338 |
| 7,711,386 B2* | 5/2010 | Sung et al. | ...... | 455/522 |
| 2006/0105709 A1* | 5/2006 | Oh et al. | ...... | 455/13.1 |
| 2008/0045260 A1* | 2/2008 | Muharemovic et al. | ...... | 455/522 |
| 2009/0303918 A1* | 12/2009 | Ma et al. | ...... | 370/315 |
| 2009/0310586 A1* | 12/2009 | Shatti | ...... | 370/338 |

FOREIGN PATENT DOCUMENTS

| | | |
|---|---|---|
| KR | 2006-38131 | 5/2006 |
| KR | 2007-038875 | 4/2007 |
| KR | 2007-080367 | 8/2007 |
| KR | 2007-112701 | 11/2007 |

\* cited by examiner

METHOD AND APPARATUS FOR JOINT SCHEDULING TO INCREASE FREQUENCY EFFICIENCY AND FAIRNESS IN A DISTRIBUTED ANTENNA SYSTEM USING FREQUENCY REUSE AND COMMON POWER CONTROL

CLAIM OF PRIORITY

This application claims the benefit of priority under 35 U.S.C. §119(a) from a Korean Patent Application filed in the Korean Intellectual Property Office on Feb. 9, 2007 and assigned Serial No. 2007-13746, the entire disclosure of which is hereby incorporated by reference in its entirety.

BACKGROUND OF THE INVENTION

1. Field of the Invention

The present invention generally relates to a technique for interaction between a scheduler and a power controller in a wireless communication system. More particularly, the present invention relates to a technique for joint scheduling and power control among a Base Station (BS) and Relay Stations (RSs) in order to increase fairness and transmission efficiency on a downlink in a Distributed Antenna System (DAS) using frequency reuse and common power control.

2. Description of the Related Art

In a conventional cellular system, a scheduler typically selects packets to be transmitted to Mobile Stations (MSs) according to their priority levels. Therefore, every MS and every BS have a common scheduler. MSs are known to suffer from different signal attenuation and interference according to their locations at given point in time. This difference in signal attenuation and interference results in the problem that when MSs are allocated the same transmit power, they have different Signal-to-interference and Noise Ratios (SINRs). In an attempt to make the SINRs of the MSs uniform, a power controller allocates higher power to remote MSs relative to the BS (or RS) and lower power to nearby MSs relative to the BS (or RS).

In a DAS that operates using frequency reuse and common power control, the link between a BS and an RS is established by a dedicated line, such as an optical fiber, and each RS functions like the BS, in that each RS serves as an antenna of the BS. The BS and the RS have their independent service areas and frequencies that can be reused in the service areas. It may occur that two MSs are located near to the boundary between the service areas, although in the different service areas and sharing the same channel. When a scheduler selects packets for the MSs, the MSs have low SINRs due to interference from the neighboring service areas, and thus there is a high probability that transmission of the packets to the MSs will result in failure. If a high power level is allocated to one or both of the MSs to increase their SINRs, a resultant increase in mutual interference nullifies the effect of the power control increasing the power level. The reason for the increase in mutual interference that nullifies the effect of the increased power level is because the power control is being performed after the scheduling. As scheduling and power control take place independently, data transmission to the MSs is failed and/or a minimum data rate is not met, thereby causing an outage. Accordingly, as the number of MSs increase and the use of the networks increase, the likelihood of the aforementioned problems will likely increase as well. Thus, there is a need in the art to provide a solution to this problem.

SUMMARY OF THE INVENTION

An aspect of exemplary embodiments of the present invention is to address in part at least some of the problems and/or disadvantages and to provide at least the advantages described below. The present invention provides a method and apparatus for decreasing outage probability and maximizing transmission efficiency by efficient interaction between a scheduler and a power controller.

Accordingly, an aspect of exemplary embodiments of the present invention is to provide a method and apparatus for efficient interaction between a scheduler and a power controller in a DAS using frequency reuse and common power control in order to maximize transmission efficiency and decrease the probability of outage. This aspect of the present invention addresses the problem associated with independent scheduling and power control on a downlink in a cellular system that operates in a diversity channel mode.

In accordance with an aspect of exemplary embodiments of the present invention, there is provided a joint scheduling for increasing frequency efficiency and fairness in a distributed antenna system using frequency reuse and common control power, in which packets to be transmitted to MSs are selected by taking into account Quality of Service (QoS) in at least one of a BS and an RS and grouped into packet groups. The packets are selected from the packet groups, links corresponding to the packets are grouped into a link group, a joint power control is performed on the link group, link elimination and link addition are performed for the link group until optimal solutions are achieved for the links of the link group in the joint power control, channels are allocated to the links when the optimal solutions are achieved for the links, and the status of a user queue of the at least one of the BS and the RS is updated.

In accordance with another aspect of exemplary embodiments of the present invention, there is provided a joint scheduling apparatus for increasing frequency efficiency and fairness in a distributed antenna system using frequency reuse and common control power, in which upon receipt of a data request from an MS directly or via an RS, a BS transmits data to the MS or the RS, a plurality of wired RSs transmit information about MSs within their service areas to the BS and allocate resources to the MSs, and a plurality of MSs are allocated resources from their serving BSs or RSs and receive data using the allocated resources.

BRIEF DESCRIPTION OF THE DRAWINGS

The above features and advantages of certain exemplary embodiments of the present invention will be more apparent from the following detailed description taken in conjunction with the accompanying drawings, in which.

DETAILED DESCRIPTION OF THE INVENTION

Figure 1:
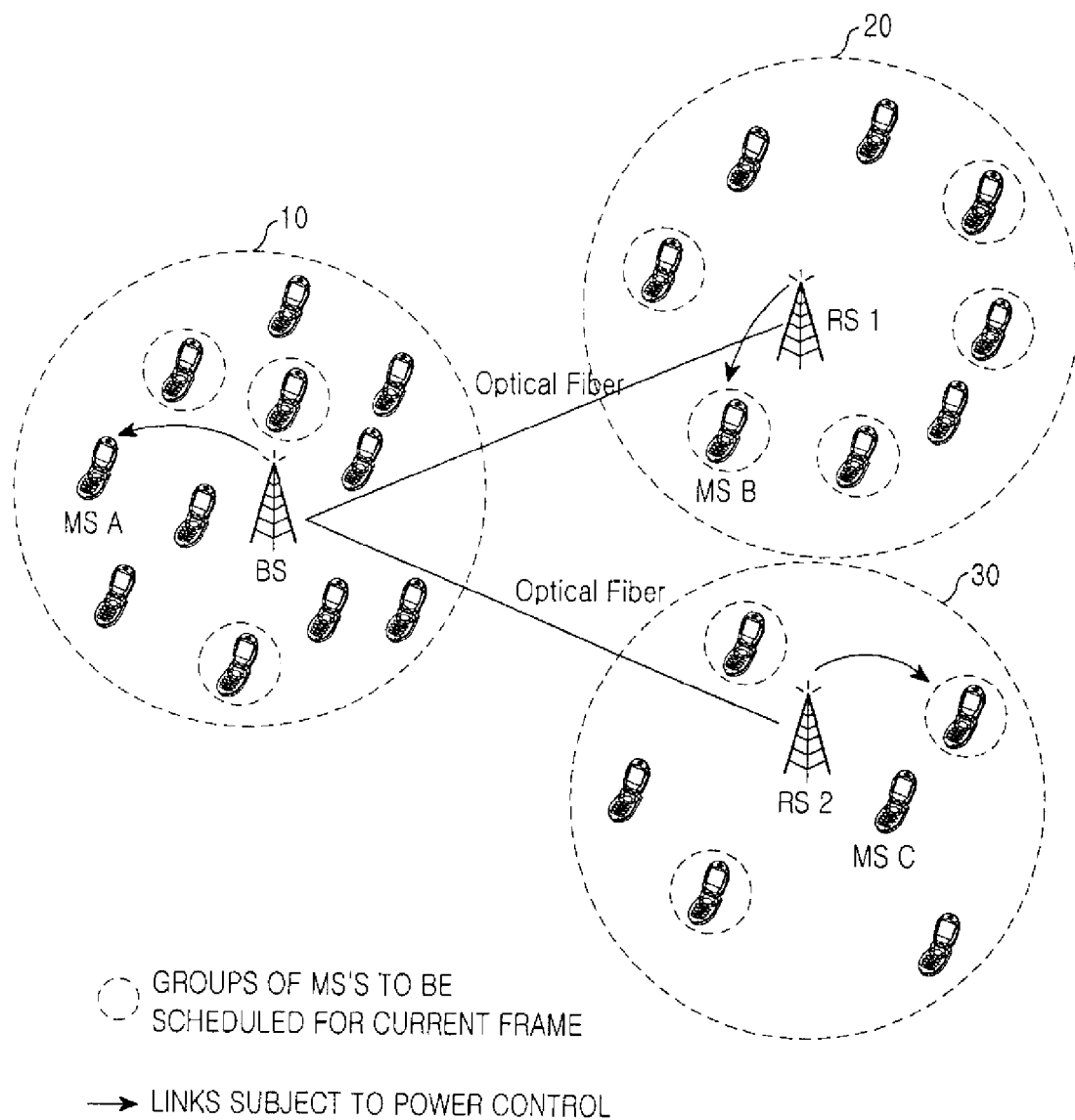
FIG. 1 illustrates an exemplary configuration of a cellular system using frequency reuse and distributed antennas to which the present invention is applied.

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the spirit of the invention of the scope of the appended claims. Also, descriptions of well-known functions and constructions may be omitted for clarity and conciseness so that a person of ordinary skill in the art can appreciate the exemplary descriptions of the present invention.

Throughout the drawings, the same drawing reference numerals will be understood to refer to the same elements, features and structures.

FIG. 1 illustrates an exemplary configuration of a cellular system using frequency reuse and distributed antennas, to which the present invention is applied. Referring to FIG. 1, a BS and RSs are positioned in respective cells 10, 20, 30 and have their distinctive service areas. Each MS (MS A, MS B, MS C, etc.) receives service from the BS or one of the RSs. The BS typically includes a buffer for buffering transmission data, a packet scheduler, and a Radio Resource Manager (RRM) for performing channel coding, modulation, power control, and channel allocation.

Still referring to the exemplary configuration shown in FIG. 1, data is transmitted during a scheduling period $T_f$ and signaling is performed for the data transmission. Basically, the scheduler selects packets for MSs from the buffer, i.e. user queues according to their priority levels and the RRM manages resources for the packets, prior to transmission.

Figure 2:
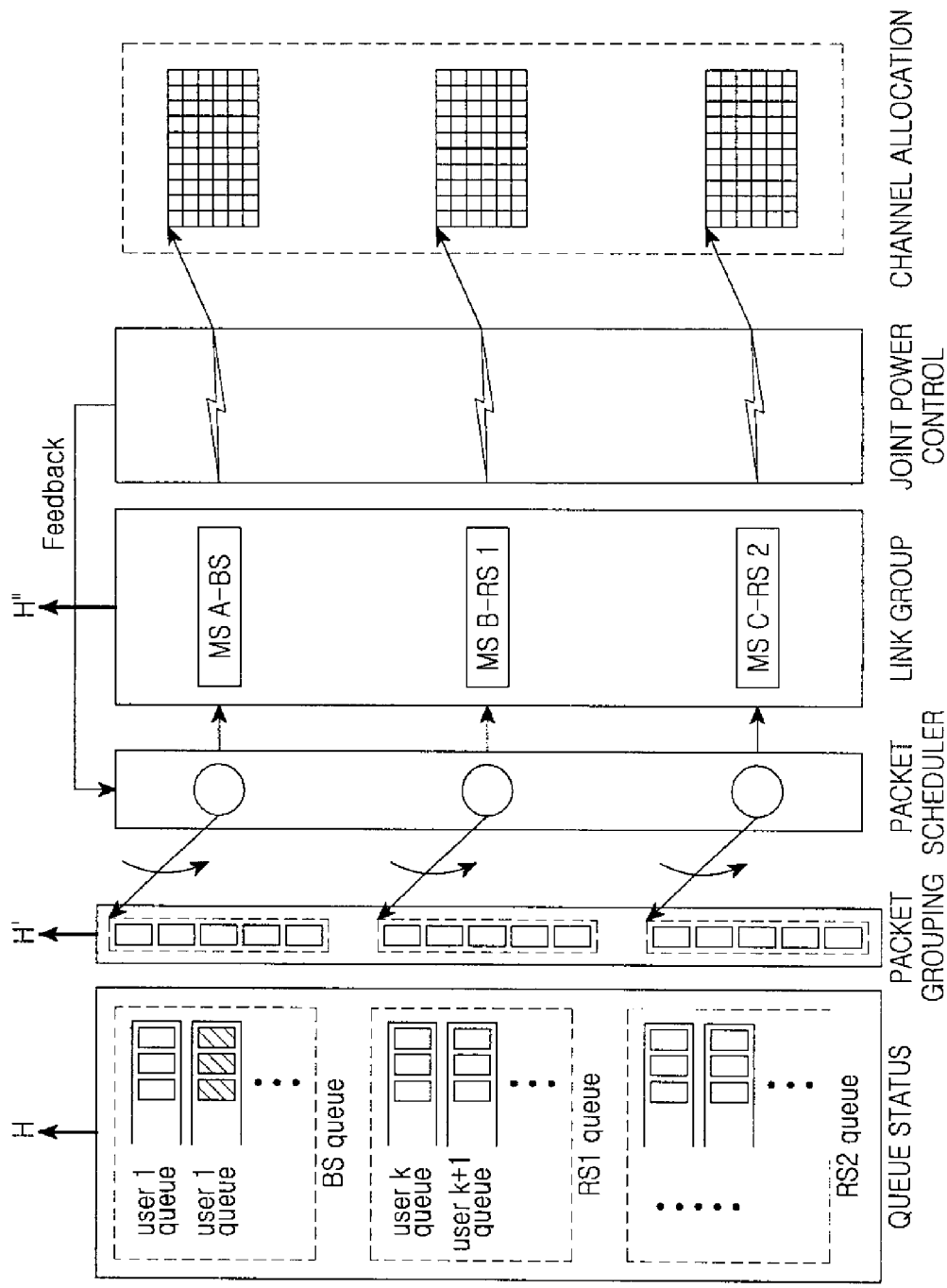
FIG. 2 conceptually illustrates the configuration of a joint scheduling and power control system according to an exemplary embodiment of the present invention.

FIG. 2 illustrates an exemplary configuration of a BS in a cellular system using joint scheduling and power control according to the present invention. FIG. 2 provides a conceptual illustration of the configuration of a joint scheduling and power control system according to an exemplary embodiment of the present invention.

Still referring to FIG. 2, the packets to be transmitted to the MSs from the BS and/or each RS are stored in user queues and packets to be transmitted during a scheduling period $T_f$ are grouped into packet groups. The packet groups may include packets that do not satisfy Quality of Service (QoS) and the packets of the packet groups should be transmitted during the scheduling period $T_f$. Groups of MSs (as shown in FIG. 1) will receive the transmitted packets.

In the respective service areas of the BS and RSs, the MSs are selected for data transmission during the scheduling period $T_f$. Herein, a channel matrix representing channels between the BS and RSs and MSs, for which packets are queued in the user queues, is denoted by 11 a channel matrix between the BS and RSs and the MSs, for which packets are grouped for transmission, is denoted by H'. The channel matrix H' is derived from the channel matrix H. The above operation is called packet grouping.

Subsequent to packet grouping as described above, a packet scheduler selects packets with the highest priority levels from the packet groups, thus selecting links between MSs and the BS and RSs, to which power control will be applied. A channel matrix representing the channels of the selected links is denoted by H". The selected links share the same channel and thus experience mutual interference. A power controller performs a joint power control on the group of these selected links and then channels are allocated to them, prior to packet transmission. If the power control does not meet a minimum SINR, the power controller feeds back information indicating a link that does not meet the minimum SINR and the packet scheduler eliminates a packet corresponding to the link and reselects a link on which a packet is to be transmitted. This operation is repeated until the SINR of each link exceeds the minimum SINR. Then, a channel allocation operation follows the power control, for packet transmission.

To represent the joint scheduling and power control by a mathematical model, the following parameters are defined.

TABLE 1

| Parameter | Description |
| --- | --- |
| $T_f$ | Scheduling period for allocation of one subchannel |
| k (k = 1, ..., K) | MS index |
| M (m = 1, ..., M) | RS index |
| $h_{k,m}$ | Channel between $m^{th}$ RS and $k^{th}$ MS |
| s(m) | A set of indexes of MSs serviced by $m^{th}$ RS |
| $P_{k,m}$ | Power allocated to $k^{th}$ MS by $m^{th}$ RS |
| $y_{k,m}$ | Signal received at $k^{th}$ MS from $m^{th}$ RS |
| $w_k$ | Noise at $k^{th}$ MS |
| $P_{min}, P_{max}$ | Minimum power and maximum power allocated to $k^{th}$ MS |

Thus, the channel matrix 11, a transmission signal matrix X, and a noise matrix W are given as $$H = \begin{bmatrix} h_{1,1} & \cdots & h_{1,M} \\ \vdots & \ddots & \vdots \\ h_{K,1} & \cdots & h_{K,M} \end{bmatrix}, \quad (1)$$

$$X = \begin{bmatrix} p_{1,1} & \cdots & p_{1,M} \\ \vdots & \ddots & \vdots \\ p_{K,1} & \cdots & p_{K,M} \end{bmatrix},$$

$$W = \begin{bmatrix} w_1 \\ \vdots \\ w_K \end{bmatrix}$$

If N subchannels have the same channel characteristics, that is, the matrix H is flat, a received signal matrix Y is expressed as $$Y = HX^T, W \quad (2)$$

An element (j, i) of the matrix Y denotes a signal for an $i^{th}$ MS received at a $j^{th}$ MS, represented as $$y_{j,i} = \sum_{m=1}^{M} h_{j,m} \cdot p_{i,m} \quad (3)$$

In Equation (3), the diagonal elements of the received signal matrix Y represent desired transmission signals and the other elements of the matrix Y represent interference signals. When each RS has a distinctive service area, elements of the matrix X representing signals that are not transmitted from the RS become 0s. Thus, $$p_{k,m} = \begin{cases} p_{k,m} & \text{if } k \in s(m) \\ 0 & \text{otherwise} \end{cases} \quad (4)$$

The packet scheduler selects one MS for each service area based on the channel matrix H" defined in FIG. 2. H" is an M×M square matrix. Then the elements (j, i) of the matrix Y is given as $$y_{j,i} = h_{j,m} \cdot p_{i,m}, \quad i \in s(m) \tag{5}$$

A transmission signal and an interference signal received at a $k^{th}$ MS are expressed as Equation (6) and Equation (7), respectively.

$$S_k = h_{k,m} \cdot p_{k,m}, \quad k \in s(m) \tag{6}$$

$$I_k = \sum_{i \neq m}^{M} h_{k,i} \cdot p_{s(i),i} \tag{7}$$

The SINR of the $k^{th}$ MS is computed by $$\gamma^k = \frac{h_{k,m} p_{k,m}}{\sum_{i \neq m}^{M} h_{k,i} \cdot p_{s(i),i} + w_k} \tag{8}$$

To render the SINRs of the MSs uniform, the solution of Equation (8) should be the same for the MSs. However, since Equation (8) is non-linear, a sub-optimal power control algorithm is derived by converting Equation (8) to a linear formula taking the form of maximum$\gamma^k$. This sub-optimal power control algorithm is written in Table 2 below.

TABLE 2

| Objective function |
|---|
| Maximize δ |
| Constraints |
| 1. minimum SINR to be ensured |
| $\frac{h_{k,m} p_k}{\sum_{i \neq m}^{M} h_{k,i} \cdot p_i + w_k} \geq \gamma^{targ\,etSINR}, \forall k$ |
| 2. SINR difference |
| $h_k \cdot p_k - \sum_{i \neq m}^{M} h_{k,i} \cdot p_i - w_k \geq \delta, \forall k$ |
| 3. power range |
| $p_{min} \leq p_k \leq p_{max}, \forall k$ |

Referring to Table 2, the difference between a received signal and interference plus noise can be set as an optimization constraint (Constraint 2 in Table 2), instead of the ratio of the received signal to the interference signal, and a function that maximizes the variable δ is set as an objective function in the sub-optimal power control algorithm. Constraint 1 describes a target SINR for MSs in the power control and Constraint 3 describes the maximum and minimum values of transmit power. The power control is performed in parallel for subchannels. That is, scheduling becomes different depending on the presence or absence of the optimal solution of the power control.

Figure 3:
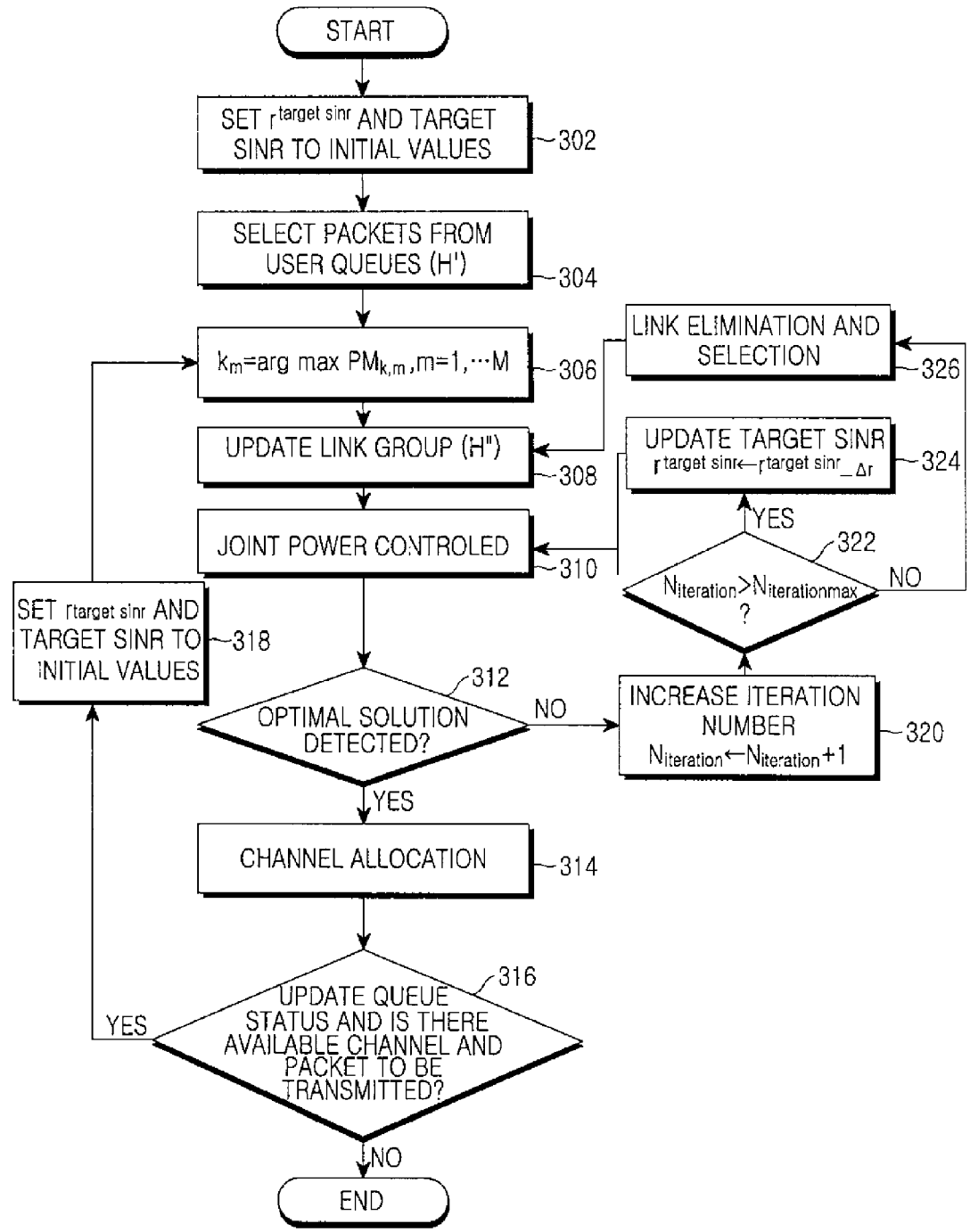
FIG. 3 is a flowchart illustrating a joint scheduling and power control operation in a diversity channel mode according to an exemplary embodiment of the present invention.

FIG. 3 is a flowchart illustrating a joint scheduling and power control operation in diversity channel mode according to an exemplary embodiment of the present invention.

Referring to the exemplary method shown in FIG. 3, in step 302 the target SINR and $\gamma^{targetSINR}$ are set to initial values, and packets are selected from user queues of the BS and the RSs according to Equation (9) in steps 304 and 306.

$$k_m^* = \arg\max_{k \in s(m)} PM_{k,m}$$

where $PM_{k,m}$ denotes a priority metric for a $k^{th}$ user queue in an $m^{th}$ RS. The priority metric can be time delay or the amount of transmission data.

The channel matrix H" (an example of which is shown in FIG. 2) is created from the selected packets and power control and channel allocation are performed. Scheduling is completed when there are no more packets to be transmitted or no more channels to be allocated. These operations are performed when the power control is successful. If the optimal solution of the power control does not exist, link elimination and addition is performed and then power control and an updated link group H" is performed in step 308. A criterion for the link selection is expressed as Equation (10).

$$k_m^* = \arg\min_{k \in s(m)} \sum_{i \neq m} \left( \frac{h_{k,i}}{h_{k,m}} \right) \tag{10}$$

which implies that a link in the best channel status is selected in the service area of the $m^{th}$ RS.

A criterion for the link elimination is expressed as Equation (11).

$$k_m^* = \arg\max_{k \in s(m)} \left( \sum_{i \neq m} \left( \frac{h_{k,i}}{h_{k,m}} \right) + \sum_{j \neq m} \left( \frac{h_{k,j}}{h_{s(j),j}} \right) \right) \tag{11}$$

where $h_{s(j),j}$ denotes a channel between a $j^{th}$ RS and an MS s(j) within the service area of the $j^{th}$ RS. In this manner, a particular link is selected in place of an eliminated link and then power control is performed again.

Figure 4:
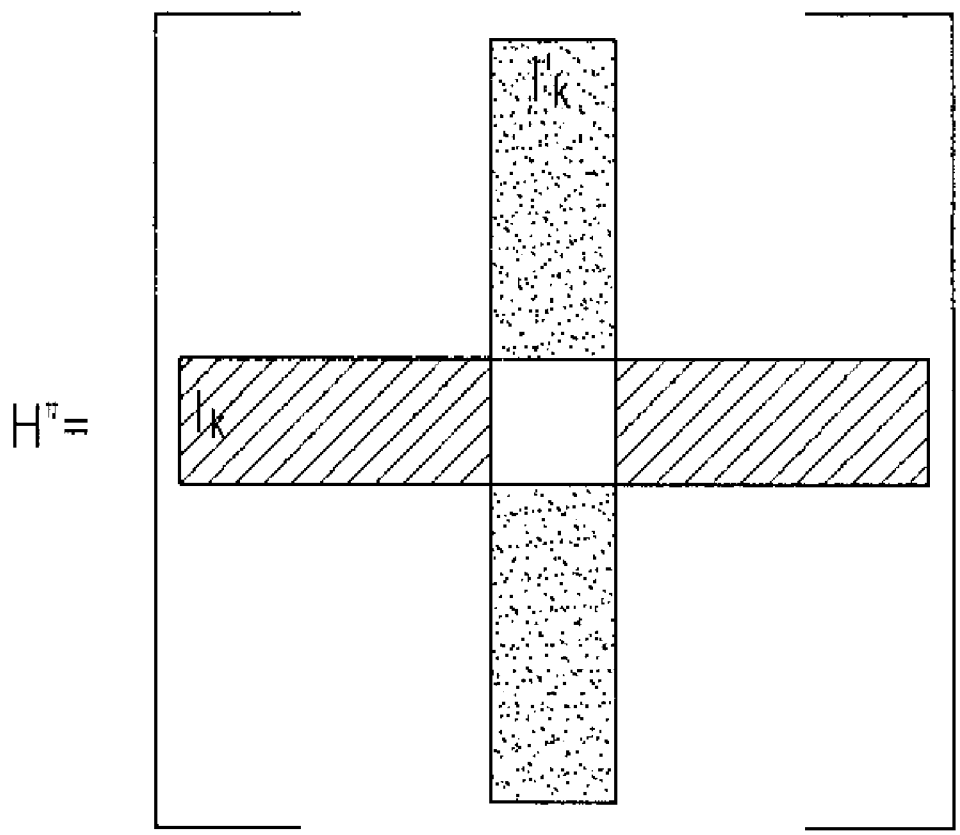
FIG. 4 illustrates a channel matrix referred to for describing link selection and elimination according to an exemplary embodiment of the present invention.

Equation (10) and Equation (11) assume the property depicted in FIG. 4. FIG. 4 illustrates a channel matrix referred to for describing link selection and elimination according to an exemplary embodiment of the present invention. Referring to FIG. 4, a link with the highest sum of interference $I_k$ received at an MS from other serving BS or RSs and interference $I'_k$ at the MS from its serving BS or RS is selected from the matrix H". In the absence of an optimal solution of power control, the link is eliminated and a particular link is selected to fill the space. Then, at step 310, a joint power control is performed.

Thus, a joint power control is performed on the matrix H" updated by the link elimination and addition according to Equation (10) and Equation (11) in step 310. In the absence of an optimal solution in step 312, the link elimination and addition is typically performed, but as the flowchart in FIG. 3 shows, there is at least one step prior to performing link elimination. The reason is as the number of H" updates through link elimination and addition increases, computational complexity increases, causing operational problems. Therefore, it is necessary to limit the number of H" updates, taking into account limited power and computation volume. To reduce the number of H" updates, the target SINR is reduced and then power control is performed for the decreased target SINR. Since the probability of achieving an optimal solution is increased by alleviating Constraint 1 in Table 2, the target SINR is decreased to or below a predetermined value.

Therefore, prior to performing link elimination, at step 320 the number of iterations $N_{iteration}$ is counted each time the power control is performed. Then, at step 322, if the number of iterations $N_{iteration}$ is larger than a maximum iteration number $N_{iterationmax}$, the target SINR is decreased to a predetermined value in step 324 and the procedure returns to step 310. If the number of iterations $N_{iteration}$ is less than or equal to the maximum iteration number $N_{iteration\ max}$ in step 322, a link is replaced (link elimination) with another link according to Equation (10) and Equation (11) in step 326, thus updating the link group H" in step 308.

Still referring to FIG. 3, on the other hand, in the presence of an optimal solution in step 312, a channel is allocated in step 314. Then the status of the user queues is updated and it is determined whether there remains a channel to be allocated and a packet to be transmitted in step 316 In the presence of a channel and a packet, the target SINR and $\gamma^{targetSINR}$ are set to initial values in step 318 and the procedure returns to step 306. In the absence of an available channel or a packet to be transmitted in step 316, the scheduling is completed.

As is apparent from the above description, the present invention overcomes outage problems caused by interference from neighboring service areas through efficient resource management in a DAS using frequency reuse and common power control. Also, the present invention reduces interference and increases transmission efficiency through joint scheduling and power control.

While the invention has been shown and described with reference to certain exemplary embodiments of the present invention thereof, it will be understood by those skilled in the art that various changes in form regarding power control and details may be made therein without departing from the spirit the present invention and the scope of the appended claims.

What is claimed is:

1. A joint scheduling method for increasing frequency efficiency and fairness in a distributed antenna system using frequency reuse and common control power, comprising:
  (a) selecting packets for transmission to Mobile Stations (MSs), said selecting taking into account Quality of Service (QoS) in at least one of a Base Station (BS) and a Relay Station (RS) and grouping the packets into packet groups;
  (b) selecting packets from the packet groups formed in step (a), grouping links corresponding to the packets into a link group, and performing a joint power control on the link group;
  (c) performing link elimination and link addition in the link group until optimal solutions are achieved for the links of the link group in the joint power control; and
  (d) allocating channels to the links when the optimal solutions are achieved for the links in step (c) and updating the status of a user queue of the at least one of the BS and the RS;
  wherein the QoS-based packet selection in step (a) comprises selecting the packets for the MSs according to priority levels of the MSs by the following equation $$k_m^* = \arg\max_{k \in s(m)} PM_{k,m}$$

where $PM_{k,m}$ denotes a priority metric for a $k^{th}$ user queue in an $m^{th}$ RS and the priority metric can be one of time delay and the amount of transmission data.

2. A joint scheduling method for increasing frequency efficiency and fairness in a distributed antenna system using frequency reuse and common control power, comprising:
  (a) selecting packets for transmission to Mobile Stations (MSs), said selecting taking into account Quality of Service (QoS) in at least one of a Base Station (BS) and a Relay Station (RS) and grouping the packets into packet groups;
  (b) selecting packets from the packet groups formed in step (a), grouping links corresponding to the packets into a link group. and performing a joint power control on the link group;
  (c) performing link elimination and link addition in the link group until optimal solutions are achieved for the links of the link group in the joint power control; and
  (d) allocating channels to the links when the optimal solutions are achieved for the links in step (c) and updating the status of a user queue of the at least one of the BS and the RS;
  wherein the link elimination and addition in step (c) comprises:
    (i) counting the number of power control iterations each time an optimal solution does not exist;
    (ii) performing a joint power control after decreasing a target Signal-to-Interference and Noise Ratio (SINR), if the number of power control iterations is larger than a predetermined value; and
    (iii) updating the link group by eliminating a link from the link group and selecting another link and performing a joint power control on the updated link group.

3. The joint scheduling method of claim 2, wherein the link group updating comprises selecting another link by $$k_m^* = \arg\min_{k \in s(m)} \sum_{i \neq m} \left( \frac{h_{k,i}}{h_{k,m}} \right)$$

which implies that a link in the best channel status is selected in the service area of an $m^{th}$ RS, and eliminating a link by $$k_m^* = \arg\max_{k \in s(m)} \left( \sum_{i \neq m} \left( \frac{h_{k,i}}{h_{k,m}} \right) + \sum_{j \neq m} \left( \frac{h_{k,j}}{h_{s(j),j}} \right) \right)$$

where $h_{s(j),j}$ denotes a channel between a $j^{th}$ RS and an MS s(j) within the service area of the $j^{th}$ RS.

4. A joint scheduling method for increasing frequency efficiency and fairness in a distributed antenna system using frequency reuse and common control power, comprising:
  selecting packets for transmission to Mobile Stations (MSs) while taking into account Quality of Service (QoS) in at least one of a Base Station (BS) and a Relay Station (RS) and grouping the packets into packet groups;
  wherein packets from the packet groups are formed by a packet grouper for transmission to MSs;
  groupings links corresponding to the packets into a link group, and performing a joint power control on the link group;
  performing link elimination and link addition in the link group until optimal solutions are achieved for the links of the link group in the joint power control being performed, wherein a criterion for the link selection is expressed as:

$$k_m^* = \arg\min_{k \in s(m)} \sum_{i \neq m} \left( \frac{h_{k,i}}{h_{k,m}} \right); \text{ and}$$

wherein $h_{k,m}$ denotes a channel between $m^{th}$ RS and $k^{th}$ MS; and allocating channels to the links when the optimal solutions are achieved, and updating the status of a user queue of the at least one of the BS and the RS.

* * * * *